United States Patent
Suzuki

(10) Patent No.: US 6,356,760 B1
(45) Date of Patent: Mar. 12, 2002

(54) MOBILE COMMUNICATION SYSTEM WITH TRAFFIC COLLECTION AND CONTROL FOR RADIO BASE STATIONS

(75) Inventor: Takayuki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/093,727

(22) Filed: Jun. 9, 1998

(30) Foreign Application Priority Data

Jun. 11, 1997 (JP) ............................................. 9-152734

(51) Int. Cl.[7] ................................................. H04Q 7/20
(52) U.S. Cl. ........................ 455/453; 455/422; 455/412
(58) Field of Search ................................. 455/453, 446, 455/455, 443, 422, 412

(56) References Cited

U.S. PATENT DOCUMENTS

| | | | | |
|---|---|---|---|---|
| 5,241,685 A | * | 8/1993 | Bodin et al. ................ | 455/453 |
| 5,276,907 A | * | 1/1994 | Meidan ...................... | 455/453 |
| 5,448,621 A | * | 9/1995 | Knudsen ..................... | 455/453 |
| 5,504,938 A | * | 4/1996 | Redden ....................... | 455/453 |
| 5,633,915 A | * | 5/1997 | Yang et al. ................. | 455/453 |
| 5,754,959 A | * | 5/1998 | Ueno et al. ................. | 455/453 |
| 5,912,884 A | * | 6/1999 | Park et al. .................. | 455/453 |
| 6,049,602 A | * | 4/2000 | Foladare et al. ............ | 379/265 |

FOREIGN PATENT DOCUMENTS

| | | | |
|---|---|---|---|
| JP | 58-161542 | * | 9/1983 |
| JP | 63-67034 | * | 3/1988 |
| JP | 4-213234 | * | 8/1992 |
| JP | 5-63635 | * | 3/1993 |
| JP | 5-292012 | * | 11/1993 |
| JP | 6-133351 | * | 5/1994 |
| JP | 6-268574 | * | 9/1994 |
| JP | 9-163443 | * | 6/1997 |

OTHER PUBLICATIONS

Japanese Office Action, dated Apr. 11, 2000, with English language translation of Japanese Examiner's comments.*

* cited by examiner

Primary Examiner—William Trost
Assistant Examiner—Simon Nguyen
(74) Attorney, Agent, or Firm—Whitham, Curtis & Christofferson, PC

(57) ABSTRACT

A mobile communication system includes using a mobile terminal, base stations and a base station control device. Each, each of the base stations cover respective areas for mobile communication service and is capable of relaying a conversation, made by the mobile terminal, by radio communication. The base station control device observes (or monitors) traffic (i.e., number of calls in progress) with respect to each of the base stations. In response to a conversation start event or a conversation end event that takes place in the mobile terminal which is located in an area of a base station whose traffic is large, the base station control device searches a surrounding base station whose traffic is relatively small. The base station control device then controls an area of the searched base station to enable radio communication with respect to the mobile terminal. For example, output of the searched base station is increased so that an area of the searched base station is broadened to cover a location of the mobile terminal. Thus, it is possible to avoid occurrence of call failure due to shortage of communication lines.

17 Claims, 7 Drawing Sheets

FIG.2

| BASE STATION NAME | NUMBER OF CALLS IN PROGRESS | OUTPUT DATA | DATA OF SURROUNDING BASE STATIONS | | | |
|---|---|---|---|---|---|---|
| BASE STATION 21 | 6 | MINIMUM | 22 | 23 | ... | ... |
| BASE STATION 22 | 3 | MINIMUM | 21 | 23 | ... | ... |
| BASE STATION 23 | 4 | MINIMUM | 22 | 23 | ... | ... |
| ...... | ... | ...... | ... | ... | ... | ... |

113a

MOBILE COMMUNICATION SYSTEM WITH TRAFFIC COLLECTION AND CONTROL FOR RADIO BASE STATIONS

BACKGROUND OF THE INVENTION

1. Field of the Invention

This invention relates to mobile communication systems that are configured by mobile stations (or mobile terminals) and radio base stations, and particularly to traffic collection and control methods employed for radio base station control devices for controlling the radio base stations. This application is based on patent application No. Hei 9-152734 filed in Japan, the content of which is incorporated herein by reference.

2. Description of the Related Art

According to the conventional traffic control method of the mobile communication system, there is provided a threshold value which is subjected to "handoff" to or from a certain base station. For example, the conventional method controls call a quantity (or number of calls) of the base station, at which a number of calls concentrate, by changing its threshold value. An example of the above method is disclosed by the paper of Japanese Patent Application, Publication No. Hei 6-164477.

Now, the above control method will be described in conjunction with FIG. 9. FIG. 9 shows an example of the mobile communication system that contains a mobile telephone exchange 4, a first radio base station 5, a second radio base station 6 and a mobile terminal 7. Consider a case where a communication channel utilization rate $\alpha$ of the first radio base station 5, which acts as a handoff source, is less than a prescribed threshold value, while a communication channel utilization rate $\beta$ of the second radio base station 6, which acts as a handoff destination, is greater than (or equal to) the prescribed threshold value. In such a case, a threshold value $\Delta AB$ is provided as a handoff condition and is used for making a decision with respect to a receiving level difference between a first receiving level, which is detected between the first radio base station 5 and the mobile terminal 7 located in proximity to the handoff source, and a second receiving level which is detected between the second radio base station 6 and the mobile terminal 7. This threshold value $\Delta AB$ is corrected by a value X, which is calculated based on the communication channel utilization rates $\alpha$ and $\beta$, so the corrected one is used as a new threshold value "$\Delta$+X". Incidentally, a reference symbol A designates an area (or base station area) set for the first radio base station 5, B designates an area (or base station area) set for the second radio base station 6. In addition, $\Delta AB$ designates the threshold value for the receiving level difference calculated in connection with a direction from the first radio base station 5 to the second radio base station 6, while $\Delta BA$ designates a threshold value for a receiving level difference calculated in connection with an inverse direction.

According to the aforementioned traffic control method which is conventionally known, controlling of traffic quantity of the base station area is performed by controlling the hand-over of the mobile terminal. So, it is not possible to reduce the traffic quantity of the base station based on where the mobile terminal is located unless the mobile terminal moves from the base station area corresponding to a hand-over source to the base station area corresponding to a hand-over destination.

In the aforementioned traffic control method, mobile terminals concentrate at the area of the base station where the handoff is performed. For this reason, if a number of the mobile terminals temporarily reaches a prescribed number of mobile terminals for which the base station allows communications, a mobile terminal which is over the prescribed number of mobile terminals cannot send or receive a call.

SUMMARY OF THE INVENTION

It is an object of the invention to provide a mobile communication system with traffic collection and control for radio base stations, which is capable of reducing a number of call failure events due to shortage of communication lines of the radio base station and which is capable of effectively using the radio resource.

A mobile communication system of this invention is established using a mobile terminal, base stations and a base station control device. Herein, each of the base stations having respective areas for mobile communication services thereof is capable of relaying conversation, made by the mobile terminal, by radio communication. The base station control device observes (or monitors) traffic (i.e., number of calls in progress) with respect to each of the base stations. In response to a conversation start event or a conversation end event that takes place in the mobile terminal which is located in an area of a base station whose traffic is large, the base station control device searches a surrounding base station whose traffic is relatively small. For management of the statuses of the base stations, the base station control device provides a table storing a number of calls in progress as well as a list of surrounding base stations with respect to each of the base stations.

The base station control device controls an area of the searched base station to enable radio communication with respect to the mobile terminal. For example, output of the searched base station is increased so that an area of the searched base station is broadened to cover location of the mobile terminal.

Thus, it is possible to provide uniform call connection service. In addition, it is possible to avoid occurrence of call failure due to shortage of communication lines, so it is possible to effectively use radio resources.

BRIEF DESCRIPTION OF THE DRAWINGS

These and other objects of the subject invention will become more fully apparent as the following description is read in light of the attached drawings wherein:

FIG. 2 shows an example of content of a table, which is set in an area control unit shown in FIG. 1;

DESCRIPTION OF THE PREFERRED EMBODIMENT

Figure 1:
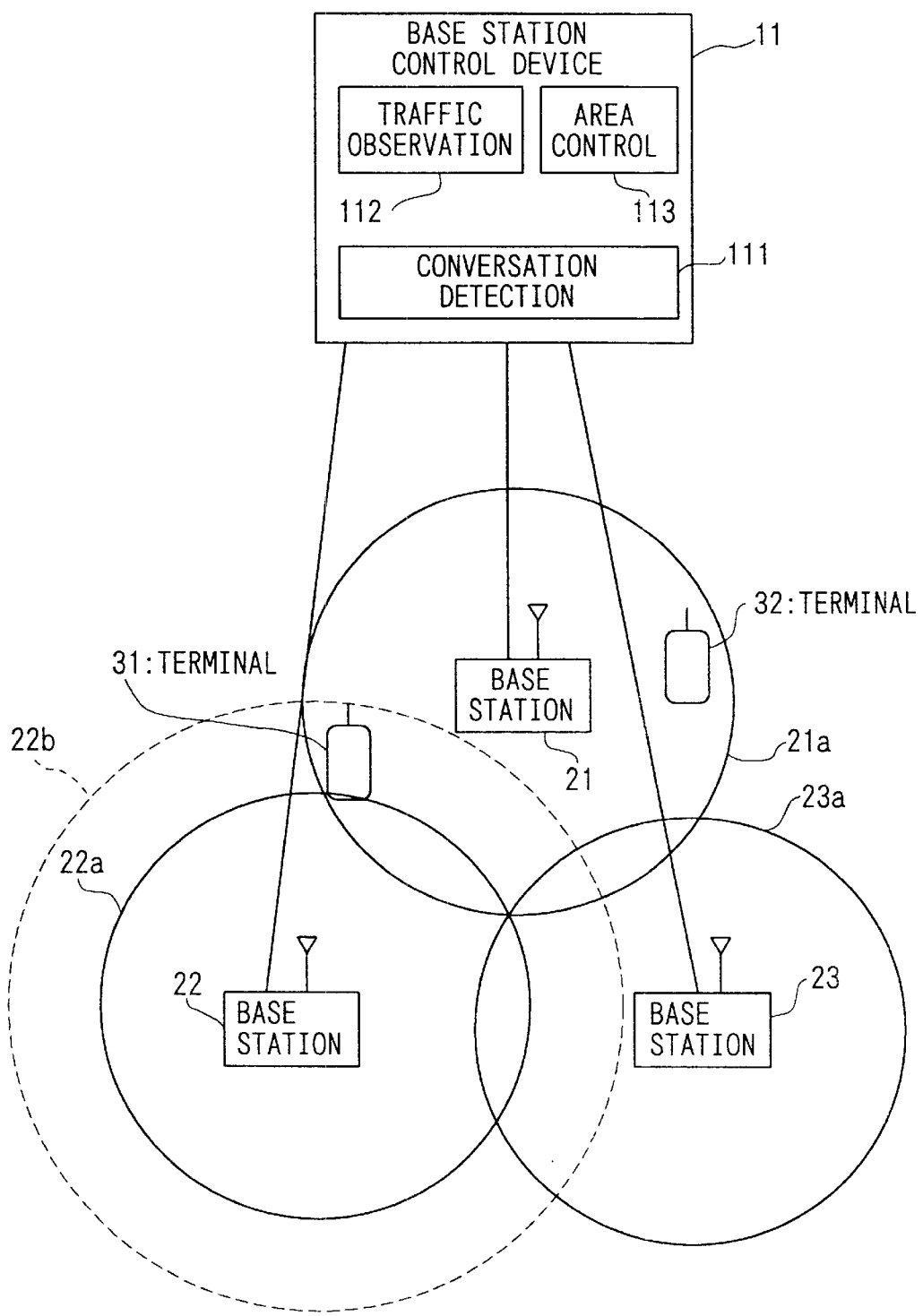
FIG. 1 is a block diagram showing an example of a mobile communication system in accordance with the invention.

FIG. 1 is a block diagram showing an example of a mobile communication system in accordance with the preferred embodiment of the invention. In FIG. 1, a base station control device 11 controls traffic of (radio) base stations 21, 22 and 23.

In FIG. 1, mobile terminals 31 and 32 are located within areas 21a, 22a and 23a, which are respectively set for the base stations 21, 22 and 23. Conversations that take place in mobile terminals 31 and 32 are relayed using radio communication to the base station control device 11, from which they are further relayed to an exchange station (not shown).

The base station control device 11 is configured using a conversation detection unit 111, a traffic observation unit (or traffic monitoring unit) 112 and an area control unit 113. Herein, the conversation detection unit 111 detects a conversation start event and a conversation end event of the mobile terminal (31, 32) at the base stations (21 to 23). So, the conversation detection unit 111 communicates the detected event(s) together with a base station ID (or identification number of the base station) to the traffic observation unit 112. After detection of the conversation start event and conversation end event, the traffic observation unit 112 calculates traffic data with respect to each of the base stations 21 to 23. The area control unit 113 broadens a conversation-enabled area of an adjacent base station, having a small number of calls, which is located adjacent to the base station whose number of calls is great. That is, the area control unit 113 controls the adjacent base station to increase its output in response to variations of the traffic data calculated for the base station whose number of calls is great, wherein the adjacent base station having a small number of calls is selected from among the base stations which are located adjacent to the base station whose number of calls is great.

At the start or end of the conversation of the base station, the conversation detection unit 111 detects a conversation start event or a conversation end event of the base station. So, the conversation detection unit 111 communicates a detection result together with an identification number of the base station to the traffic observation unit 112.

Based on the identification numbers as well as the communication start events and communication end events which are communicated from the conversation detection unit 111, the traffic observation unit 112 calculates a number of calls in progress that each of the base stations 21 to 23 presently makes, so the calculated number is communicated to the area control unit 113.

When receiving the number of calls in progress, which is calculated for each of the base stations 21 to 23 and is communicated from the traffic observation unit 112, the area control unit 113 communicates it to the mobile terminal (31, 32) over a control channel (not shown) of the corresponding base station. At an event that a certain base station increases a number of calls in progress, the area control unit 113 selects a base station whose traffic is small from among the base stations surrounding the certain base station. So, the area control unit 113 makes a request to increase radio output of the selected base station whose traffic is small.

Each of the base stations 21 to 23 has a function to control radio output in response to an instruction of the area control unit 113 of the base station control device 11. So, the base station broadcasts traffic information, given from the base station control device 11, to the mobile terminal over the control channel thereof.

In the case of the minimum output, the areas 21a, 22a and 23a are set for the base stations 21, 22 and 23 respectively. Herein, each of the areas 21a, 22a and 23a is capable of covering the full service area, which is determined in advance. In response to a request from the base station control device 11, the base station 22 is solely capable of broadening the area thereof up to an area 22b.

The mobile terminal (31, 32) receives the traffic information from each of the base stations 21 to 23 over its control channel. Based on the traffic information, the mobile terminal makes a call using a base station whose traffic is small and which is selected from among the base stations that do not obstruct the conversation.

FIG. 2 shows an example of a configuration of a table 113a provided in the area control unit 113 of the base station control device 11 of FIG. 1. The table 113a of FIG. 2 stores multiple pieces of information with regard to each of the base stations, which are designated by base station names of "Base Station 21", "Base Station 22", "Base Station 23", . . . In the table 113a, there are provided multiple items, i.e., "Number of Calls in Progress" and "Output Data" as well as "Data of Surrounding Base Stations". As for the item of "Number of Calls in Progress", numbers such as "6", "3" and "4" are listed with regard to the base stations 21, 22 and 23 respectively. As for the item of "Output Data" which represents an output state of each base station, words such as "Minimum", "Medium" and "Maximum" can be listed. As for the item of "Data of Surrounding Base Stations", data and numerals designating the base stations, such as "21", "22" and "23", are listed. The content of the table 113a is changeable in response to the observation result of the traffic control unit 112 and the control result of the area control unit 113.

Figure 3:
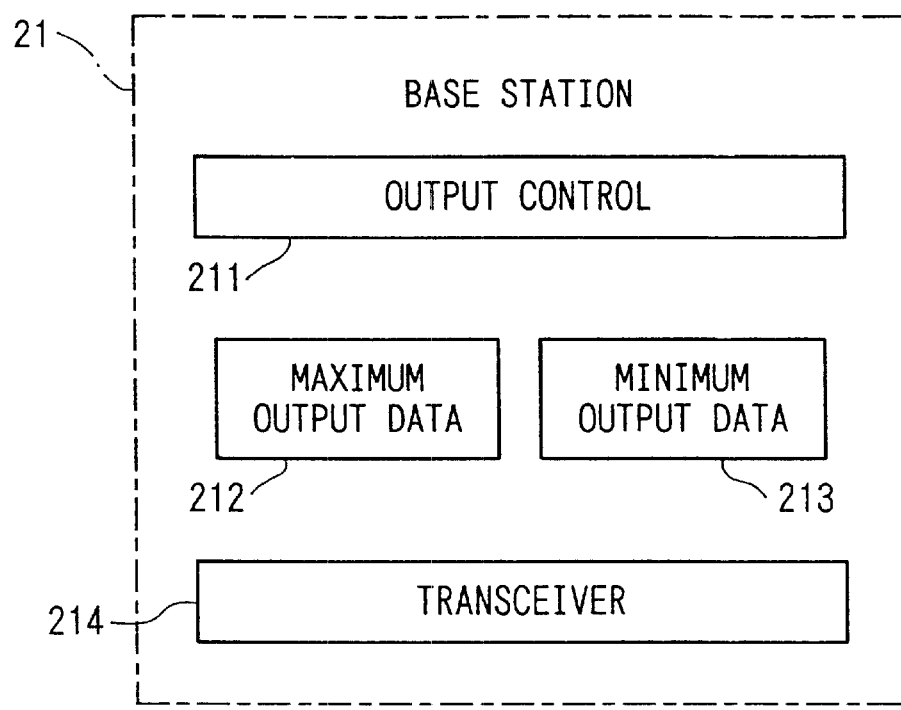
FIG. 3 is a block diagram showing an internal configuration of a base station.

FIG. 3 is a block diagram showing an internal configuration of the base station 21, for example. Herein, the base station 21 is configured using an output control unit 211, a maximum output data storage unit 212, a minimum output data storage unit 213 and a transceiver unit 214.

The output control unit 211 receives an area change request given from the area control unit 113 of the base station control device 11. When the area change request represents a request to increase output, the output control unit 211 increases the output of the base station 21 if the output is less than a value of the maximum output data storage unit 212. When the area change request represents a request to decrease output, the output control unit 211 decreases the output of the base station 21 if the output is greater than a value of the minimum output data storage unit 213.

The transceiver unit 214 of the base station 21 receives data representing a communication channel and a control channel which is communicated thereto from the base station control device 11 so as to transmit them by radio. For convenience' sake, detailed configurations of the other base stations 22 and 23 are not illustrated, however, they are similar to the aforementioned configuration of the base station 21. So, operations of the base stations 22 and 23 are similar to the aforementioned operation of the base station 21.

Figure 4:
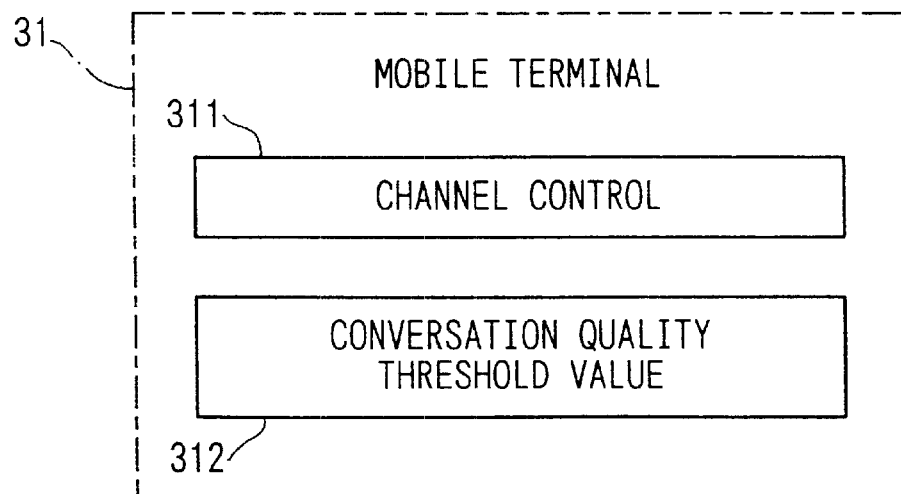
FIG. 4 is a block diagram showing an internal configuration of a mobile terminal.

FIG. 4 is a block diagram showing an internal configuration of the mobile terminal 31. Herein, the mobile terminal 31 is configured using a channel control unit 311 and a conversation quality threshold value storage unit 312.

When the mobile terminal 31 starts a conversation, the channel control unit 311 receives all of control channels which are receivable. If the control channels do not contain the control channel whose conversation quality is better than a value of the conversation quality threshold value storage unit 312, the channel control unit 311 selects the control channel whose conversation quality is the highest among the control channels. So, the channel control unit 311 uses the selected control channel to perform the conversation.

If there exists the control channel whose conversation quality is better than a value of the conversation quality threshold value storage unit 312, the channel control unit 311 starts conversation by selecting a base station whose number of calls in progress is small. The aforementioned area control unit 113 of the base station control device 11 communicates information such a base station whose number of calls in progress is small to the mobile terminal 31 via a certain base station. Incidentally, an internal configuration of the other mobile terminal 32, which is not illustrated, is similar to the aforementioned internal configuration of the mobile terminal 31. So, operation of the mobile terminal 32 is similar to the aforementioned operation of the mobile terminal 31.

Figure 5A:
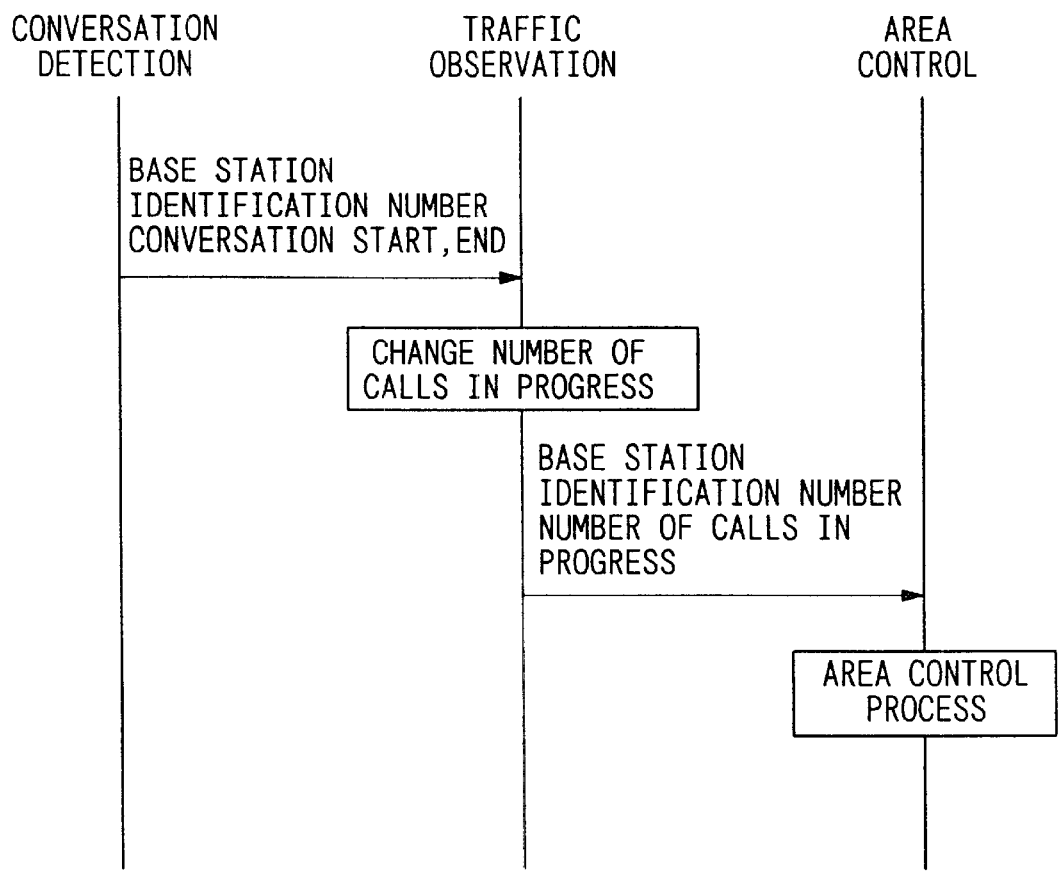
FIG. 5A is a sequence chart showing a sequence of operations with respect to start and end of conversation that take place in a base station control device shown in FIG. 1.
Figure 5B:
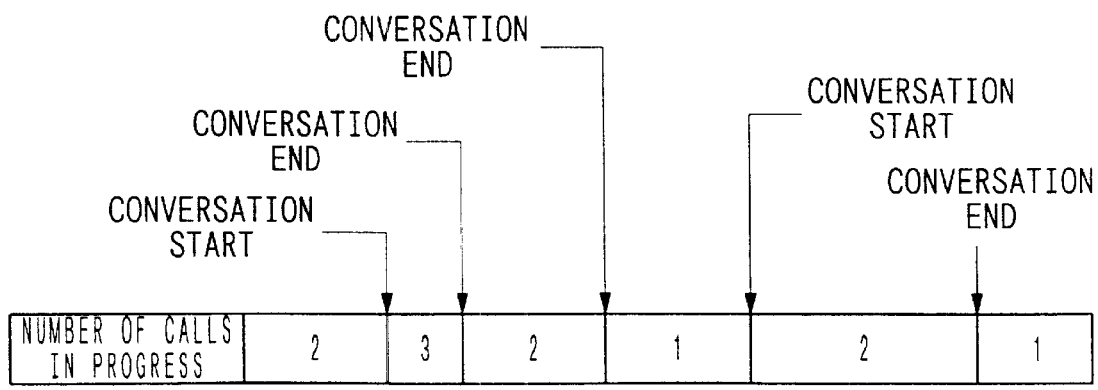
FIG. 5B shows an example of variations of numbers of calls in progress, which are observed by a traffic observation unit shown in FIG. 1.

FIG. 5A is a sequence chart showing operations of the base station control device 11 shown in FIG. 1 at detection of the start of conversation. FIG. 5B shows variations of observation results of the traffic observation unit 112 of the base station control device 11.

Figure 6:
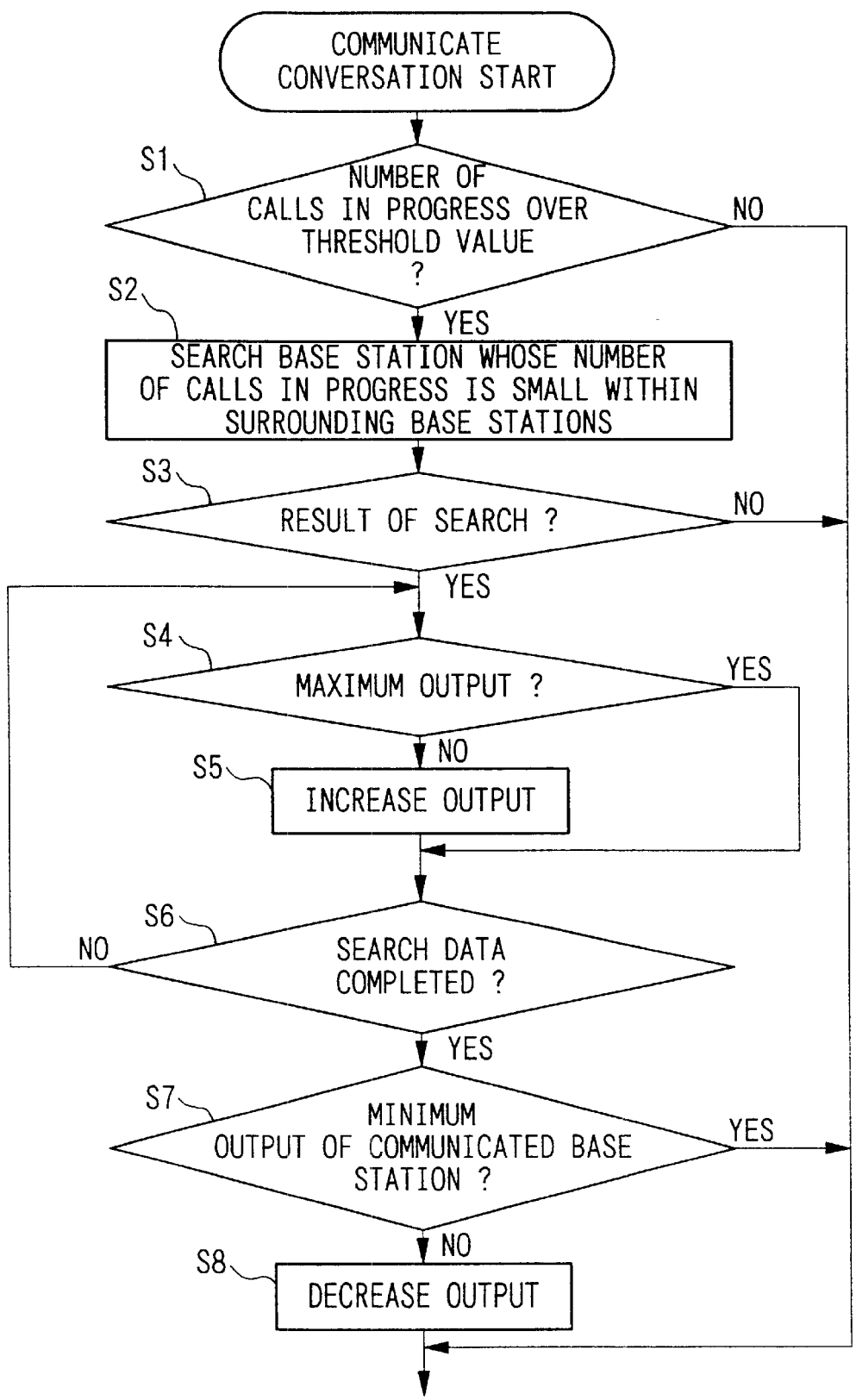
FIG. 6 is a flowchart showing operations of an area control unit shown in FIG. 1.
Figure 7:
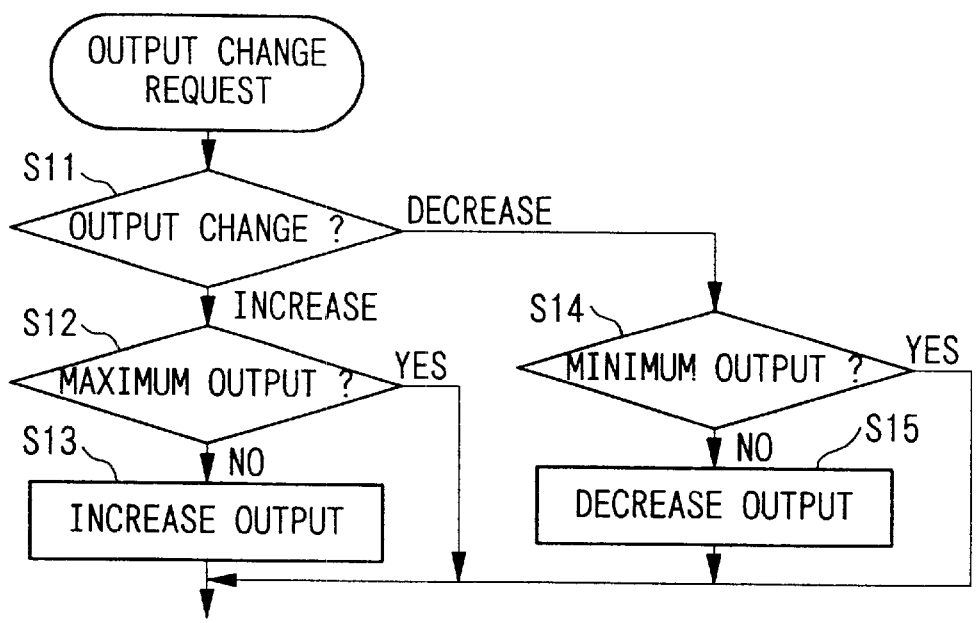
FIG. 7 is a flowchart showing operations of a base station shown in FIG. 1.
Figure 8:
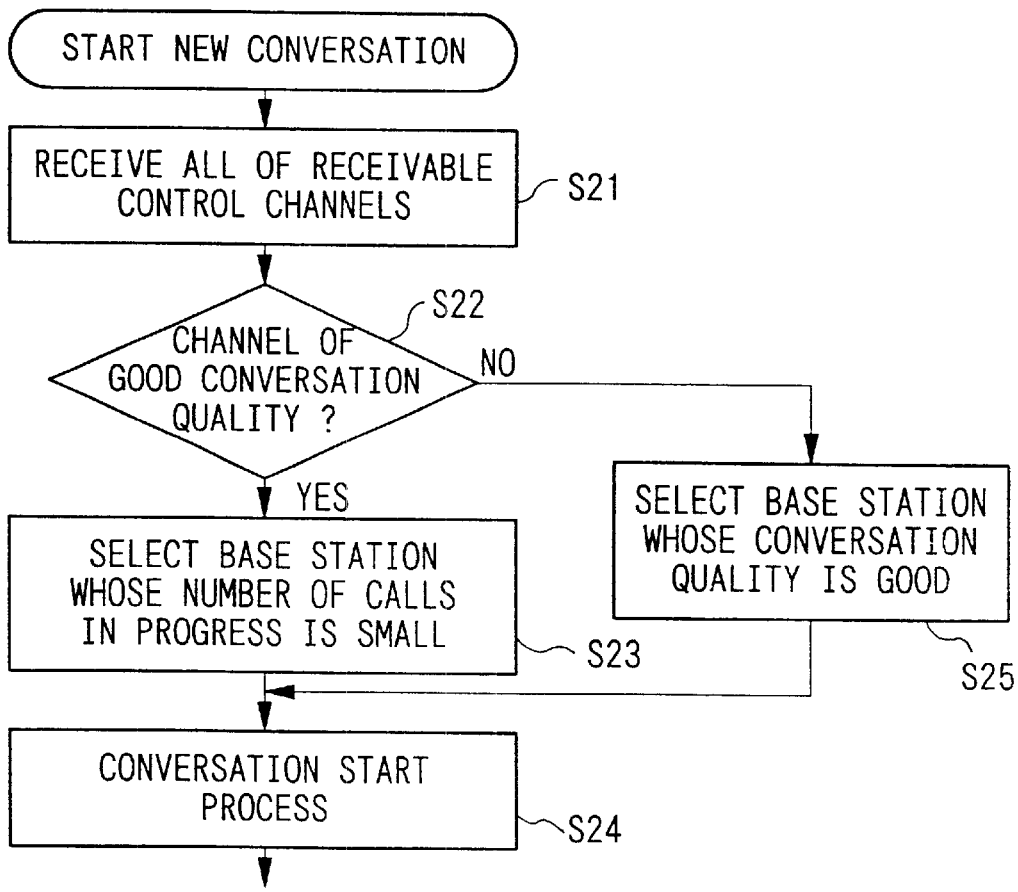
FIG. 8 is a flowchart showing operations of a mobile terminal shown in FIG. 1.
Figure 9:
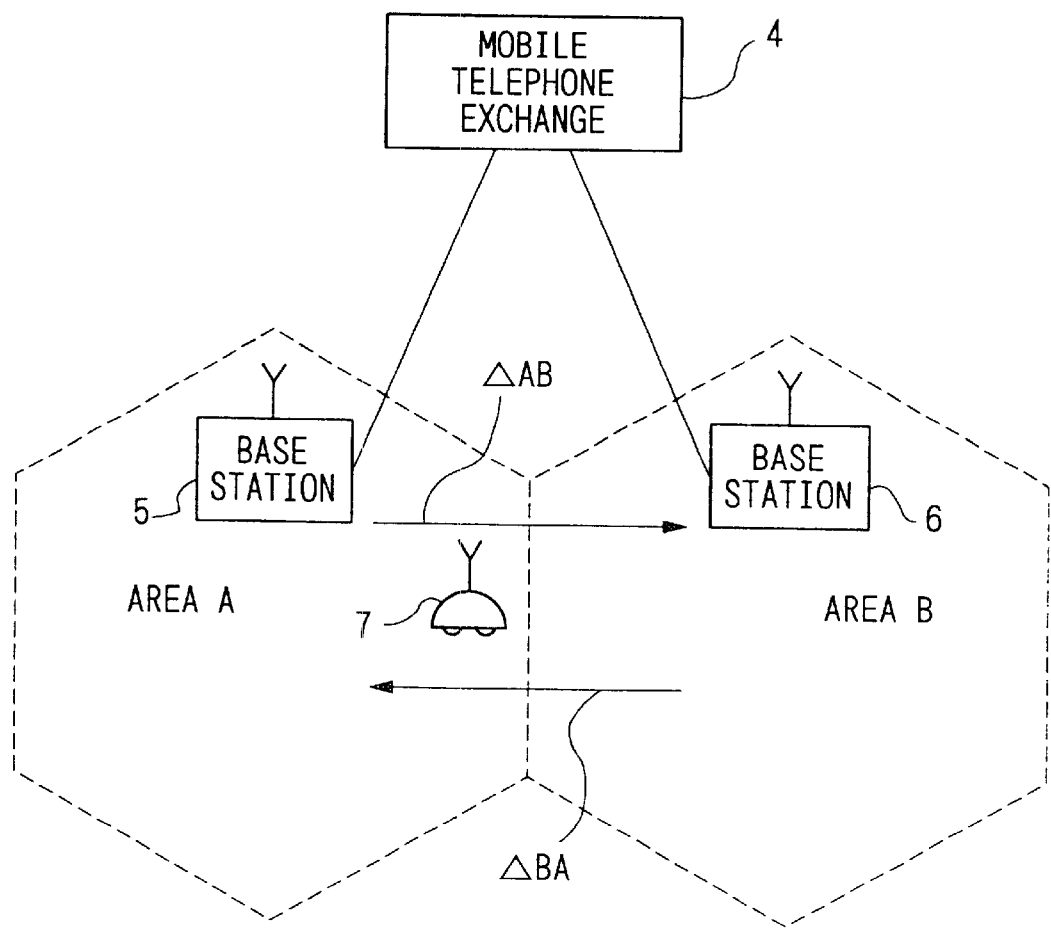
FIG. 9 is a block diagram showing an example of a mobile communication system, which is conventionally known.

FIG. 6 is a flowchart showing operations of the area control unit 113 of the base station control device 11. FIG. 7 is a flowchart showing operations of the base station (21–23). FIG. 8 is a flowchart showing operations of the mobile terminal (31, 32). Using the aforementioned figures (i.e., FIG. 1 to FIG. 8), a description will be given with respect to the operation of the traffic control in accordance with the present example of the invention.

Incidentally, operations of the base station control device 11, base stations 21–23 and mobile terminals 31, 32 are respectively actualized by execution of control programs stored in a control memory (not shown). As for the control memory, it is possible to employ the ROM (i.e., read-only memory), floppy disk and the like.

At first, the mobile terminal 32 receives a control channel from a surrounding base station thereof so as to start conversation using the base station 21. Thus, the conversation detection unit 111 of the base station control device 11 detects the start of the conversation. The conversation detection unit 111 communicates with the traffic observation unit 112 to inform a conversation start event, representing the start of the conversation, and an identification number of the base station 21 at which the conversation is started. The traffic observation unit 112 manages a number of calls in progress within a traffic observation area (not shown) of the base station 21 corresponding to the identification number, which is communicated thereto from the conversation detection unit 111. So, the traffic observation unit 112 adds "1" to a present number of the calls in progress within the traffic observation area (see FIG. 5B).

When the mobile terminal 32 ends the conversation using the base station 21, the conversation detection unit 111 detects an end of the conversation. Thus, the conversation detection unit 111 communicates with the traffic observation unit 112 to inform a conversation end event, representing the end of the conversation, and an identification number of the base station 21 at which the conversation is ended. So, the traffic observation unit 112 decreases "1" from the present number of calls in progress within the traffic observation area corresponding to the identification number of the base station 21, which is communicated thereto from the conversation detection unit 111 (see FIG. 5B).

When the conversation detection unit 111 detects a conversation start event or a conversation end event as described above, the traffic observation unit 112 communicates the number of calls in progress and the identification number of the base station 21 to the area control unit 113 (see FIG. 5A).

The area control unit 113 makes a decision as to whether the number of calls in progress, which is assigned to the base station 21 and is communicated from the traffic observation unit 112, is greater than a specific threshold value (e.g., "6") or not in step S1 shown in FIG. 6. If the number of calls in progress is over the specific threshold value, a program control goes to step S2 wherein the area control unit 113 searches surrounding base stations from the content of the table 113a. Among the surrounding base stations, the area control unit 113 extracts a base station (e.g., base station 22) whose traffic is small and whose amount of increasable output capacity is greater than a threshold value (e.g., "3"). So, the area control unit 113 issues an output increase request that requests the base station 22 to increase output. These operations are made in steps S3, S4 and S5 in FIG. 6. Incidentally, if the base station 23 has a small traffic and an amount of increasable output capacity that is greater than the threshold value, the area control unit 113 issues an output increase request to the base station 23 as well.

When inputting the output increase request from the area control unit 113 (see step S11 in FIG. 7), the base station 22 makes a decision with respect to radio output thereof. That is, if the radio output of the base station 22 is not the maximum output so that the area 22b is not established (see step S12), the base station 22 increases the radio output thereof to enlarge the area thereof up to the area 22b (see step S13).

On the other hand, when inputting an output decrease request from the area control unit 113 (see step S11), the base station 22 makes a decision with respect to the radio output thereof. That is, if the radio output is not the minimum output so that the area 22a is not established (see step S14), the base station 22 decreases the radio output thereof so as to downsize the area thereof to the area 22a (see step S15). Incidentally, each of the base stations 21 to 23 broadcasts traffic information thereof over the control channel.

At completion of the process for obtaining search data (see step S6), corresponding to the aforementioned search performed in step S2, the area control unit 113 proceeds to step S7. If the output of the base station 21, to which a conversation start event is communicated, is not the minimum output so that the area of the base station 21 does not coincide with the area 21a, the area control unit 113 issues an output decrease request to the base station 21 (see step S8).

When starting a new conversation, the mobile terminal 31 receives all of receivable control channels with respect to the base stations 21 to 23 (see step S22 shown in FIG. 8), wherein the base station 21 has six channels while the base station 22 has three channels, for example. If there exists a channel whose conversation quality is good (see step S22), the mobile terminal 31 selects a base station whose traffic is the smallest, i.e., base station 22 whose number of calls in progress is small (see step S23). Using the selected base station 22, the mobile terminal 31 performs conversation with a called party (see step S24).

If there exists no channel whose conversation quality is good (see step S22), the mobile terminal 31 selects a channel whose conversation quality is better within the existing channels (see step S25). So, the mobile terminal 31 performs conversation with a called party via the base station over the selected channel.

The present example of the invention is described with respect to the case where the area of the base station 22 is broadened in response to an increase of the traffic of the base station 21. The present example can be designed in such a way that an output decrease request is not made with respect to the base station 22 even in the case where the traffic quantity of the base station 21 is reduced in order to decrease the output of the base station 22 when the traffic of the base station 22 increases.

As described heretofore, the present example of the invention is designed as follows:

The traffic observation unit 112 normally observes the traffic quantity with respect to each of the base stations 21 to 23. When a number of calls in progress of the base station 21, to which a conversation start event is communicated, exceeds a prescribed threshold value, the system of the present example broadens the area of the base station 22 whose traffic quantity is small within adjacent base stations (i.e., surrounding base stations 22 and 23) of the base station 21. Thus, it is possible to perform conversation at a same location by using multiple base stations. For this reason, it is possible to effectively use the radio resource (not shown) of the base stations 21 to 23 in the specific area at which traffic quantity changes in response to time bands.

In addition, each of the base stations 21 to 23 has its own threshold value for a number of calls. So, it is possible to increase the radio resource, on which conversations are enabled, by broadening the area of each of the surrounding base stations before call failure occurs due to the shortage of the radio resource. Therefore, it is possible to improve the communication service quality in the case where the multiple mobile terminals concentrate in the same area.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A mobile communications system comprising:

a plurality of mobile terminals;

a plurality of base stations, each of which relays a conversation made by at least one of said mobile terminals located in a preset area by radio communication; and a base station control device for controlling traffic for the plurality of base stations respectively, wherein said base station control device further comprises:

detection means for detecting a conversation start event or a conversation end event which is caused by the mobile terminal and which occurs in the plurality of base stations respectively, management means for managing traffic data corresponding to a base station whose conversation start event or conversation end event is detected by the detection means, and control means for controlling a radio output of another one of the base stations in response to variations of the traffic data, wherein said management means includes a table storing information representing a number of calls in progress in said base stations and information indicative of an output state of said base stations, said management means managing said traffic data based on the information in said table.

2. A mobile communication system as defined in claim 1 wherein the control means further comprises search means for searching a base station whose number of calls in progress is small within the base stations which are located adjacent to the base station whose number of calls in progress exceeds a prescribed threshold value, increase means for increasing output of the base station whose number of calls in progress is small, which is searched by the search means, and decrease means for decreasing output of the base station whose number of calls in progress exceeds the prescribed threshold value.

3. A mobile communication system as defined in claim 1 wherein each of the plurality of base stations contains means for increasing or decreasing output thereof in response to an instruction given from the base station control means.

4. A mobile communication system as defined in claim 1 wherein the base station control device contains communication means for communicating the traffic data, managed by the management means, to its corresponding base station, each of the plurality of base stations containing broadcast means for broadcasting the traffic data, communicated from the communication means, over a control channel established between the mobile terminal and the base station, while each of the plurality of mobile terminals contains receiving means for receiving the traffic data, which are communicated thereto from the plurality of base stations over control channels respectively, and means for enabling conversation using one of the base stations whose traffic quantity is small, which is capable of performing the conversation and which is selected from the plurality of base stations on the basis of the traffic data received by the receiving means.

5. A traffic collection control method for a mobile communication system which contains a plurality of mobile terminals, a plurality of base stations, each of which relays conversation made by the mobile terminal located in a preset area by radio communication, and a base station control device for controlling traffic of the plurality of base stations respectively, said traffic collection control method comprising the steps of:

detecting a conversation start event or a conversation end event with respect to the plurality of base stations respectively, managing traffic data with respect to the base station whose conversation start event or conversation end event is detected;

controlling a radio output of the base station in response to variations of the traffic data; and storing in said base station control device a table which includes information representing a number of calls in progress in said base stations and information indicative of an output state of said base stations, said managing step being performed based on the information in said table.

6. A traffic collection control method as defined in claim 5 further comprising the steps of:

searching a base station whose number of calls in progress is small within the base stations which are located adjacent to the base station whose number of calls in progress exceeds a prescribed threshold value;

increasing output of the searched base station whose number of calls in progress is small; and decreasing output of the base station whose number of calls in progress exceeds the prescribed threshold value.

7. A traffic collection control method as defined in claim 5 further comprising the step of:

increasing or decreasing output of the base station in response to an instruction given from the base station control device.

8. A traffic collection control method as defined in claim 5 further comprising the steps of:

communicating the traffic data, managed by the base station control device, to its corresponding base station;

broadcasting the traffic data, communicated from the base station control device, over a control channel established between the mobile terminal and the base station;

receiving the traffic data, which are broadcast over control channels from the plurality of base stations respectively, by the mobile terminal; and performing conversation of the mobile terminal using a base station whose traffic quantity is small, which is capable of performing the conversation and which is selected from the base stations on the basis of the received traffic data.

9. A machine-readable recording media storing a traffic collection control program provided for a mobile communication system that contains a plurality of mobile terminals, a plurality of base stations, each of which relays conversation made by the mobile terminal located in a preset area by radio communication, and a base station control device for controlling traffic of the plurality of base stations respectively, said traffic collection control program causing the base station control device to perform a traffic collection control method comprising the steps of:

detecting a conversation start event or a conversation end event with respect to the plurality of base stations respectively, managing traffic data with respect to the base station whose conversation start event or conversation end event is detected; and controlling a radio output of the base station in response to variations of the traffic data, wherein said traffic collection control method further comprises:

storing in said base station control device a table which includes information representing a number of calls in progress in said base stations and information indicative of an output state of said base stations, said managing step being performed based on the information in said table.

10. A machine-readable recording media storing the traffic collection control program as defined in claim 9 wherein the traffic collection control method further comprises the steps of:

searching a base station whose number of calls in progress is small within the base stations which are located adjacent to the base station whose number of calls in progress exceeds a prescribed threshold value;

increasing output of the searched base station whose number of calls in progress is small; and decreasing output of the base station whose number of calls in progress exceeds the prescribed threshold value.

11. A mobile communication system comprising:

a mobile terminal;

a plurality of base stations which are located adjacent to each other and which include first and second base stations, wherein each of the plurality of base stations has an area for communication service thereof and is capable of relaying conversation made by the mobile terminal by radio communication; and a base station control device for controlling traffics of the base stations such that the mobile terminal, originally located at an area of the first base station whose traffic quantity is relatively large, is capable of performing conversation using the second base station whose traffic quantity is relatively small by broadening an area of the second base station, said base station control device including a table storing information representing at least a number of calls in progress with respect to said first and second base stations.

12. A machine-readable recording media storing the traffic collection control program as defined in claim 9 wherein the traffic collection control method further comprises the steps of:

communicating the traffic data, managed by the base station control device, to its corresponding base station;

broadcasting the traffic data, communicated from the base station control device, over a control channel established between the mobile terminal and the base station;

receiving the traffic data, which are respectively broadcast from the base stations over control channels, by the mobile terminal; and performing conversation of the mobile terminal using a base station whose traffic quantity is small, which is capable of performing the conversation and which is selected from the base stations on the basis of the received traffic data.

13. A mobile communication system comprising:

a mobile terminal;

a plurality of base stations which are located adjacent to each other and which include first and second base stations, wherein each of the plurality of base stations has an area for communication service thereof and is capable of relaying conversation made by the mobile terminal by radio communication; and a base station control device for controlling traffic of the base stations such that the mobile terminal, originally located in an area of the first base station whose traffic quantity is relatively large, is capable of performing conversation using the second base station whose traffic quantity is relatively small, said base control device including means for increasing a radio output of the second base station to thereby broaden an area of the second base station to encompass said mobile terminal, wherein said base station control device includes a table storing information representing a number of calls in progress in said base stations and information indicative of an output state of said base stations, said base station control device controlling traffic of the base stations based on the information in said table.

14. A mobile communication system as defined in claim 13 wherein the base station control device comprises conversation detection means for detecting a conversation start event or a conversation end event that takes place in the mobile terminal, traffic observation means for observing traffic quantity with respect to each of the base stations, and area control means for controlling an area of the second base station whose traffic quantity is small as compared with the first base station in response to the conversation start event or conversation end event.

15. A mobile communication system as defined in claim 13 wherein the traffic quantity of each of the base stations corresponds to a number of calls in progress.

16. A mobile communication system as defined in claim 13 wherein the base station control device comprises conversation detection means for detecting a conversation start event or a conversation end event that takes place in the mobile terminal, search means activated at detection of the conversation start event for searching a base station whose traffic quantity is small within the plurality of base stations, and conversation start means for starting the conversation of the mobile terminal using the searched base station whose traffic quantity is small.

17. A mobile communication system, comprising:
 a plurality of mobile terminals;
 a plurality of base stations, each of which relays a conversation made by at least one of said mobile terminals located in a preset area by radio communication; and
 a base station control device for controlling traffic for the plurality of base stations respectively,
wherein said base station control device further includes:
  a detector that detects a conversation start event or a conversation end event which is caused by the mobile terminal and which occurs in the plurality of base stations respectively,
  a monitor that monitors traffic data corresponding to the base station whose conversation start event or conversation end event is detected by the detector,
  a searcher for searching a base station whose number of calls in progress is small within the base stations which are located adjacent to the base station whose number of calls in progress exceeds a prescribed threshold value, and
  an output control for increasing a radio output of the searched base station whose number of calls in progress is small while decreasing output of the base station whose number of calls in progress exceeds the prescribed threshold value,
 wherein said base station control device includes a table storing information representing a number of calls in progress in said base stations and information indicative of an output state of said base stations, said base station control device controlling traffic of said base stations based on the information in said table.

* * * * *